United States Patent
Gan et al.

(10) Patent No.: US 6,759,170 B2
(45) Date of Patent: Jul. 6, 2004

(54) ORGANIC CARBONATE ADDITIVES FOR NONAQUEOUS ELECTROLYTE RECHARGEABLE ELECTROCHEMICAL CELLS

(75) Inventors: Hong Gan, East Amherst, NY (US); Esther S. Takeuchi, East Amherst, NY (US); Robert Rubino, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 115 days.

(21) Appl. No.: 10/235,405

(22) Filed: Sep. 5, 2002

(65) Prior Publication Data

US 2003/0129500 A1 Jul. 10, 2003

Related U.S. Application Data

(63) Continuation-in-part of application No. 09/738,143, filed on Dec. 15, 2000, now abandoned, which is a continuation-in-part of application No. 09/302,773, filed on Apr. 30, 1999, now abandoned.
(60) Provisional application No. 60/105,280, filed on Oct. 22, 1998.

(51) Int. Cl.[7] .................................................. H01M 6/16
(52) U.S. Cl. .................... 429/326; 429/330; 429/332; 429/307; 429/215; 429/323; 429/231.4; 429/231.8; 429/217; 429/231.1; 429/231; 429/231.3; 29/623.1
(58) Field of Search .................................. 429/326, 330, 429/332, 307, 215, 323, 231.4, 231.8, 217, 231.1, 232, 231.3; 29/623.1

(56) References Cited

U.S. PATENT DOCUMENTS 4,830,939 A 5/1989 Lee et al.
4,853,304 A 8/1989 Ebner et al.
5,260,148 A 11/1993 Idota
5,358,620 A 10/1994 Golovin et al.
5,580,684 A 12/1996 Yokoyama et al.
5,753,389 A 5/1998 Gan et al.
5,998,065 A 12/1999 Tsutsumi et al.
6,103,426 A 8/2000 Narang et al.
6,153,338 A 11/2000 Gan et al.

FOREIGN PATENT DOCUMENTS

| DE | 2834485 | 2/1980 |
|----|---------|--------|
| EP | 0325218 | 7/1989 |
| EP | 0785586 | 7/1997 |
| EP | 0803924 A2 | 10/1997 |
| EP | 0 996 187 A1 | 4/2000 |

(List continued on next page.)

OTHER PUBLICATIONS

Impedance Spectroscopy of Nonactive Metal Electrodes at Low Potentials in Propylene Carbonate Solutions Doran Aurbac and Arie Zabon, pp. 1808–1819; J. Electrochem. Soc. vol. 141, No. 7, Jul. 1994.

(List continued on next page.)

*Primary Examiner*—Laura Weiner
(74) *Attorney, Agent, or Firm*—Michael F. Scalise

(57) ABSTRACT

A lithium ion electrochemical cell having high charge/discharge capacity, long cycle life and exhibiting a reduced first cycle irreversible capacity, is described. The stated benefits are realized by the addition of at least one carbonate additive to an electrolyte comprising an alkali metal salt dissolved in a solvent mixture including ethylene carbonate, dimethyl carbonate, ethyl methyl carbonate and diethyl carbonate. The preferred additive is either a linear or cyclic carbonate containing covalent O—X and O—Y bonds on opposite sides of a carbonyl group wherein at least one of the O—X and the O—Y bonds has a dissociation energy less than about 80 kcal/mole.

32 Claims, 2 Drawing Sheets

FOREIGN PATENT DOCUMENTS

| | | |
|---|---|---|
| FR | 0683537 | 11/1995 |
| JP | 6349523 | 5/1995 |
| JP | 08106909 | 4/1996 |
| JP | 08162153 | 6/1996 |
| JP | 62086673 | 4/1997 |
| JP | 10261435 | 9/1998 |
| WO | 9629750 | 9/1996 |

OTHER PUBLICATIONS

J. Electroanal Chem., 339 (1992) 451–471; Elsevier Sequoia S.A. Lausanne; The behavior of lithium electrodes in propylene and ethylene carbonate: the major factors that influence Li cycling efficiency; Doron Aurbach; Yosef Gofer, Moshe Ben–Zio and Pinchas Aped.

Technical Papers; Electrochemical Science and Technology; The Correlation Between the Surface Chemistry and the Performance of Li–Carbon Intercalation Anodes for Rechargeable "Rocking Chair" Type Batteries: Doron Aurbach, yair Ein–Eli and Orit Chusid: J. Electrochme Soc. vol., 141 No. 3, Mar., 1994.

The Electrochemical Behavior or Methyl. Formate (MF) Solutions; Yair Ein Elv and Doron Aurbach; Department of Chemistry; Bar–Han University; Ramat Gan 52100, Israel; pp. 157–169.

Influence of Electrolyte on Lithium Cycling Efficiency With Pressurized Electrode Stack: Toshior Hirai. Issmu Yoshimatsu, and Jun–ichi Yamaki, NTT Interdisciplinary Research Laboratories, J. Electrochem, Soc., vol. 141, No.3, Mar. 1994.

E.S. Takeuchi et al., *J. Electrochem. Soc. 144*, 1944–1948, 1997.

XP–002129699 Japan (Abstract).

XP–002129700 Japan (Abstract).

XP–002129701 Japan (Abstract).

ORGANIC CARBONATE ADDITIVES FOR NONAQUEOUS ELECTROLYTE RECHARGEABLE ELECTROCHEMICAL CELLS

CROSS-REFERENCE TO RELATED APPLICATIONS

The present application is a continuation-in-part of application Ser. No. 09/738,143 filed Dec. 15, 2000, abandoned, which is a continuation-in-part of application Ser. No. 09/302,773 filed Apr. 30, 1999, abandoned, which claims priority based on U.S. provisional application Serial No. 60/105,280, filed Oct. 22, 1998.

BACKGROUND OF INVENTION

The present invention generally relates to an alkali metal electrochemical cell, and more particularly, to a rechargeable alkali metal cell. Still more particularly, the present invention relates to a lithium ion electrochemical cell activated with an electrolyte having an additive provided to achieve high charge/discharge capacity, long cycle life and to minimize the first cycle irreversible capacity. According to the present invention, the preferred additive to the activating electrolyte is a carbonate compound.

Alkali metal rechargeable cells typically comprise a carbonaceous anode electrode and a lithiated cathode electrode. Due to the high potential of the cathode material (up to 4.3V vs. Li/Li$^+$ for Li$_{1-x}$CoO$_2$) and the low potential of the carbonaceous anode material (0.01V vs. Li/Li$^+$ for graphite) in a fully charged lithium ion cell, the choice of the electrolyte solvent system is limited. Since carbonate solvents have high oxidative stability toward typically used lithiated cathode materials and good kinetic stability toward carbonaceous anode materials, they are generally used in lithium ion cell electrolytes. To achieve optimum cell performance (high rate capability and long cycle life), solvent systems containing a mixture of a cyclic carbonate (high dielectric constant solvent) and a linear carbonate (low viscosity solvent) are typically used in commercial secondary cells. Cells with carbonate-based electrolytes are known to deliver more than 1,000 charge/discharge cycles at room temperature.

One aspect of the present invention involves the provision of ethylene carbonate (EC), dimethyl carbonate (DMC), ethyl methyl carbonate (EMC) and diethyl carbonate (DEC) as the solvent system for the activating electrolyte. However, lithium ion cell design generally involves a trade off in one area for a necessary improvement in another, depending on the targeted cell application. The achievement of a lithium-ion cell capable of low temperature cycleability by use of the above quaternary solvent electrolyte, in place of a typically used binary solvent electrolyte (such as 1.0M LiPF$_6$/EC:DMC=30:70, v/v which freezes at −11° C.), is obtained at the expense of increased first cycle irreversible capacity during the initial charging (approximately 65 mAh/g graphite for 1.0M LiPF$_6$/EC:DMC:EMC:DEC=45:22:24.8:8.2 vs. 35 mAh/g graphite for 1.0M LiPF$_6$/EC:DMC=30:70). Due to the existence of this first cycle irreversible capacity, lithium ion cells are generally cathode limited. Since all of the lithium ions, which shuttle between the anode and the cathode during charging and discharging originally come from the lithiated cathode, the larger the first cycle irreversible capacity, the lower the cell capacity in subsequent cycles and the lower the cell efficiency. Thus, it is desirable to minimize or even eliminate the first cycle irreversible capacity in lithium ion cells while at the same time maintaining the low temperature cycling capability of such cells.

According to the present invention, these objectives are achieved by providing an organic carbonate in the quaternary solvent electrolyte. Lithium ion cells activated with these electrolytes exhibit lower first cycle irreversible capacities relative to cells activated with the same quaternary solvent electrolyte devoid of the carbonate additive. As a result, cells including the carbonate additive presented higher subsequent cycling capacity than the control cells. The cycleability of the present invention cells at room temperature, as well as at low temperatures, i.e., down to about −20° C., is as good as cells activated with the quaternary electrolyte devoid of a carbonate additive.

SUMMARY OF THE INVENTION

It is commonly known that when an electrical potential is initially applied to lithium ion cells constructed with a carbon anode in a discharged condition to charge the cell, some permanent capacity loss occurs due to the anode surface passivation film formation. This permanent capacity loss is called first cycle irreversible capacity. The film formation process, however, is highly dependent on the reactivity of the electrolyte components at the cell charging potentials. The electrochemical properties of the passivation film are also dependent on the chemical composition of the surface film.

The formation of a surface film is unavoidable for alkali metal systems, and in particular, lithium metal anodes, and lithium intercalated carbon anodes due to the relatively low potential and high reactivity of lithium toward organic electrolytes. The ideal surface film, known as the solid-electrolyte interphase (SEI), should be electrically insulating and ionically conducting. While most alkali metal, and in particular, lithium electrochemical systems meet the first requirement, the second requirement is difficult to achieve. The resistance of these films is not negligible, and as a result, impedance builds up inside the cell due to this surface layer formation, which induces unacceptable polarization during the charge and discharge of the lithium ion cell. On the other hand, if the SEI film is electrically conductive, the electrolyte decomposition reaction on the anode surface does not stop due to the low potential of the lithiated carbon electrode.

Hence, the composition of the electrolyte has a significant influence on the discharge efficiency of alkali metal systems, and particularly the permanent capacity loss in secondary cells. For example, when 1.0M LiPF$_6$/EC:DMC=30:70 is used to activate a secondary cell, the first cycle irreversible capacity is approximately 35 mAh/g of graphite. However, under the same cycling conditions, the first cycle irreversible capacity is found to be approximately 65 mAh/g of graphite when 1.0M LiPF$_6$/EC:DMC:EMC:DEC=45:22:24.8:8.2 is used as the electrolyte. In contrast, lithium ion cells activated with the binary solvent electrolyte of ethylene carbonate and dimethyl carbonate cannot be cycled at temperatures less than about −11° C. The quaternary solvent electrolyte of EC, DMC, EMC and DEC, which enables lithium ion cells to cycle at much lower temperatures, is a compromise in terms of providing a wider temperature application with acceptable cycling efficiencies. It would be highly desirable to retain the benefits of a lithium ion cell capable of operating at temperatures down to as low as about −40° C. while minimizing the first cycle irreversible capacity.

According to the present invention, these objectives are achieved by adding a carbonate additive in the above-described quaternary solvent electrolytes. In addition, this invention may be generalized to other nonaqueous organic electrolyte systems, such as binary solvent and ternary solvent systems, as well as the electrolyte systems containing solvents other than mixtures of linear or cyclic carbonates. For example, linear or cyclic ethers or esters may also be included as electrolyte components. Although the exact reason for the observed improvement is not clear, it is hypothesized that the carbonate additive competes with the existing electrolyte components to react on the carbon anode surface during initial lithiation to form a beneficial SEI film. The thusly-formed SEI film is electrically more insulating than the film formed without the carbonate additive and, as a consequence, the lithiated carbon electrode is better protected from reactions with other electrolyte components. Therefore, lower first cycle irreversible capacity is obtained.

These and other objects of the present invention will become increasingly more apparent to those skilled in the art by reference to the following description and to the appended drawings.

DETAILED DESCRIPTION OF THE PREFERRED EMBODIMENTS

Figure 1:
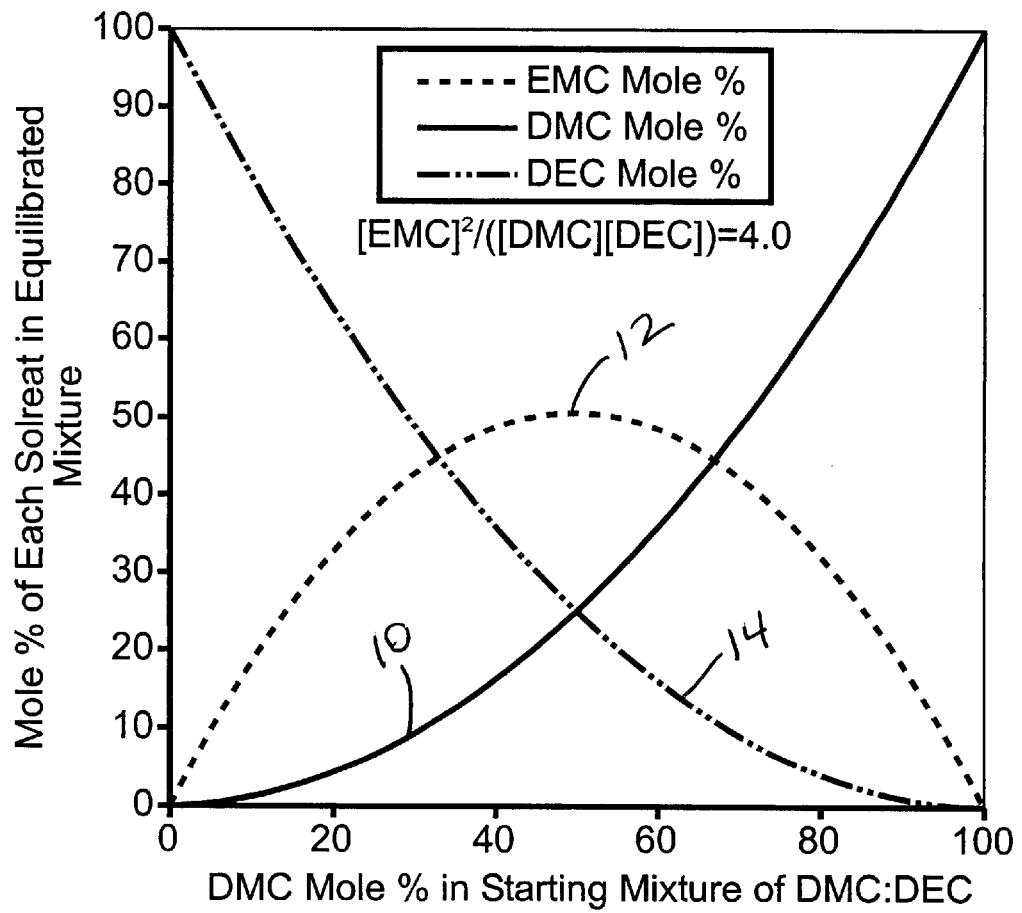
FIG. 1 is a graph of equilibrated molar mixtures of DMC:EMC:DEC based on a starting mixture of DMC:DEC.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because the fibers have excellent mechanical properties that permit them to be fabricated into rigid electrodes capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the carbonaceous anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into an electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluoro-resin binder, preferably in a powder form, such as PTFE, PVDF, ETFE, polyamides, polyimides, and mixtures thereof.

To discharge such secondary cells, lithium ions comprising the cathode are intercalated into the carbonaceous anode by applying an externally generated electrical potential to recharge the cell. The applied recharging electrical potential serves to draw the lithium ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide, carbon and fluorinated carbon. However, this approach is compromised by problems associated with handling lithiated carbon outside of the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. The form of the separator typically is a sheet that is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. Li/Li$^+$ for Li$_{1-x}$CoO$_2$) and the low potential of the anode material (0.01V vs. Li/Li$^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), ethyl propyl carbonate (EPC), and mixtures thereof, and at least one cyclic carbonate selected from propylene carbonate (PC), ethylene carbonate (EC), butylene carbonate (BC), vinylene carbonate (VC), and mixtures thereof. Organic carbonates are generally used in the electrolyte solvent system for such battery chemistries because they exhibit high oxidative stability toward cathode materials and good kinetic stability toward anode materials.

Preferred electrolytes according to the present invention comprise solvent mixtures of EC:DMC:EMC:DEC. Most preferred molar percentages for the various carbonate solvents include EC in the range of about 10% to about 50%; DMC in the range of about 5% to about 75%; EMC in the range of about 5% to about 50%; and DEC in the range of about 3% to about 45%. However, in formulating a quaternary mixed solvent system for an electrolyte activating a lithium ion cell according to the present invention, it is important that DMC, EMC and DEC are essentially at an equilibrium molar condition from the beginning so that the electrolyte does not undergo significant chemical decomposition during cell cycling.

The reason for this is that as the cell cycles between a discharged and a charged state, DMC and DEC undergo an ester exchange reaction to produce product EMC. Also, EMC disproportionates to DMC and DEC during cell cycling. If the ternary solvents of DMC:EMC:DEC are not filled into the cell in an essentially equilibrated molar mixture, cell performance changes as DMC and DEC react to form EMC, and EMC disproportionates to form DMC and DEC. In that light, a cell which is initially rated for discharge at, for example, -20° C. would not be capable of such performance after several cycles as the molar ratio of EMC:DMC:DEC changes in an ester exchange reaction or a disproportionation reaction. Such unpredictability is not acceptable in a lithium ion cell.

Given a starting mixture of DEC and DMC, there are a fixed number of ethoxy and methoxy groups that will exchange under equilibrium conditions. The extent of exchange is determined by the relative energies of the reactants (DEC and DMC) and the product (EMC). In this case, the reactants and product are very similar structurally and energetically. Therefore, the equilibrium constant is consistent with a random distribution of ethoxy and methoxy groups in the reaction mixture. For example, in the case of a 50:50 mixture of DMC and DEC, there are an equal number of ethoxy and methoxy groups. This means there is a 25% chance of two ethoxy groups combining to give DEC, a 25% chance of two methoxy groups combining to give DMC, and a 50% chance of an ethoxy group and a methoxy group combining to give EMC at a relative concentration of DMC:DEC:EMC of 1:1:2. This means that a "k" constant for an essentially equilibrated molar mixture is calculated as $[EMC]^2/([DMC][DEC])$ or $4[2^2/(1 \times 1)]$. Since the equilibrium constant is independent of the initial concentrations of the reactants, this constant is valid for any starting mixture of DMC and DEC. In that respect, a suitable range for the k constant for an essentially equilibrated molar mixture of DMC, EMC and DEC according to the present invention is about 3.85 to about 4.15 or about 4.0±0.15, more preferably about 3.95 to about 4.05, and most preferably about 4.0.

FIG. 1 is a graph showing various equilibrated molar mixtures of DMC:EMC:DEC based on a starting ratio of DMC:DEC. For example, reading from left to right on the x-axis or abscissa of FIG. 1, if the beginning DMC % (molar) in an initial DMC:DEC mixture is about 25.0% DMC, the exemplary starting mixture of DMC:DEC begins as about 25.0% DMC:75.0% DEC. A line is then drawn from this point parallel to the y-axis, intersecting curves 10, 12 and 14 for the respective molar percentages in the equilibrated mixture of DMC, EMC and DEC. This starting mixture equilibrates to a molar mixture (read on the y-axis or ordinate) of about 6.2% DMC, 37.5% EMC and 56.3% DEC. This equilibrated mixture no. 1 and those of two other exemplary mixtures from the graph of FIG. 1 are set forth in Table 1 below.

TABLE 1

| Mixture No. | DMC % (molar) in initial DMC:DEC Mixture | Resulting Equilibrated Mixture of DMC:EMC:DEC |
|---|---|---|
| 1 | 25:75 | 6.2:37.5:56.3 |
| 2 | 50:50 | 25:50:25 |
| 3 | 75:25 | 56.3:37.5:6.2 |

After the constituents EMC, DMC and DEC are provided in the electrolyte in an essentially equilibrated molar mixture, ethylene carbonate is added to tailor the cell to a particular application.

Electrolytes containing this quaternary carbonate mixture exhibit freezing points below -50° C., and lithium ion cells activated with such mixtures have very good cycling behavior at room temperature as well as very good discharge and charge/discharge cycling behavior at temperatures below -20° C.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, and mixtures thereof. Suitable salt concentrations typically range between about 0.8 to 1.5 molar.

In accordance with the present invention, at least one organic carbonate additive is provided as a co-solvent in the electrolyte solution. Specifically, the organic carbonate additive has the general formula X—O—CO—O—Y. The additive is either linear or cyclic and includes covalent O—X and O—Y bonds on opposite sides of the carbonyl group with at least one of the O—X and the O—Y bonds having a dissociation energy less than about 80 kcal/mole. The X and Y constituents are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$. Further, $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl. The constituents $R_3$, $R_4$, $R_5$, $R'_3$, $R'_4$ and $R'_5$ are independently selected from the group consisting of: H; a substituted or unsubstituted aryl group of 6 to 14 ring members; a substituted or unsubstituted heteroaryl group of 6 to 14 ring members; a branched or unbranched $C_{1-9}$ alkyl; a branched or unbranched $C_{1-9}$ alkenyl; a branched or unbranched $C_{1-9}$ alkynyl; a $C_{1-9}$ alkoxy; a $C_{3-14}$ cycloalkyl; a $C_{3-14}$ cycloalkenyl; and —$CX_3$ in which X=Cl or F. Finally, $R_6$, $R_7$, $R'_6$ and $R'_7$ are independently selected from the group consisting of: a substituted or unsubstituted aryl group of 6 to 14 ring members; a substituted or unsubstituted heteroaryl group of 6 to 14 ring members; and a cyano group.

Examples of organic carbonate additives useful with the present invention include:

X = Y = $NR_1R_2$

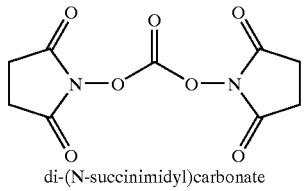

di-(N-succinimidyl)carbonate

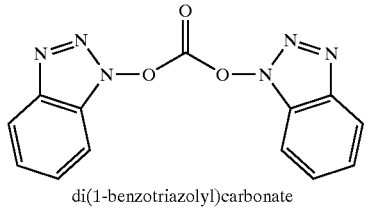

di(1-benzotriazolyl)carbonate

X ≠ Y then X = $NR_1R_2$ and Y = $NR'_1R_2$

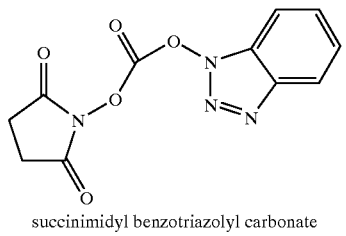

succinimidyl benzotriazolyl carbonate

X ≠ Y then X = $NR_1R_2$ and Y = $CR_3R_4R_5$

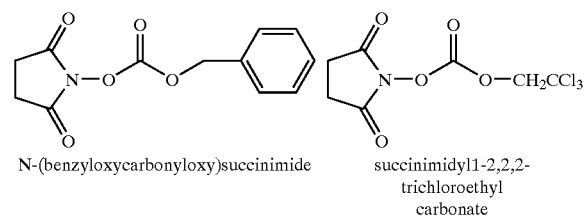

N-(benzyloxycarbonyloxy)succinimide     succinimidyl1-2,2,2-trichloroethyl carbonate

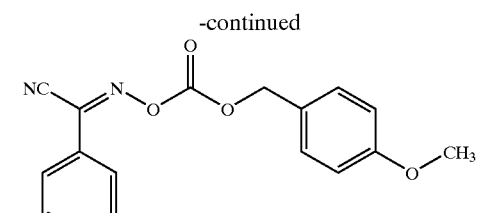

2-(4-methoxybenzyloxycarbonyloxyimino)-2-phenylacetonitrile

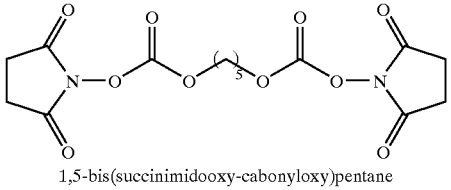

1,5-bis(succinimidooxy-cabonyloxy)pentane

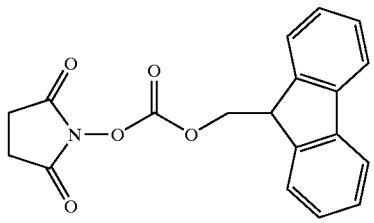

N-(9-fluorenylmethoxy-carbonyloxy) succinimide

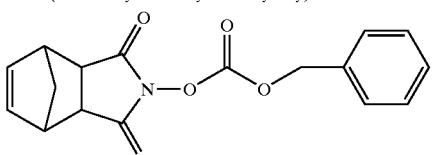

N-benzyloxycarbonyloxy-5-norbornene-2,3-dicarboximide

X = Y = $CR_3R_4R_5$ and $R_3$ = unsaturated group

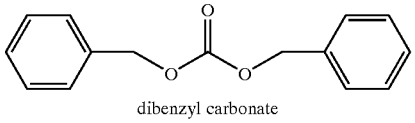

dibenzyl carbonate

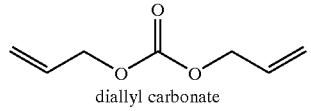

diallyl carbonate

X ≠ Y then X = $CR_3R_4R_5$, $R_3$ = unsaturated group and Y = $CR'_3R'_4R'_5$

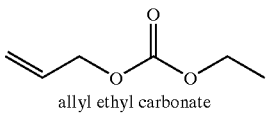

allyl ethyl carbonate

The greatest effect is found when di-(N-succinimidyl) carbonate (DSC), benzyl-(N-succinimidyl) carbonate (BSC), and dibenzyl carbonate (DBC), and mixtures thereof are used as additives in the electrolyte. Another useful carbonate additive is 4-phenyl-1,3-dioxolan-2-one.

The above compounds are only intended to be exemplary of those that are useful with the present invention, and are not to be construed as limiting. Those skilled in the art will readily recognize compounds coming under the purview of the general formulas set forth above and which are useful as carbonate additives for the electrolyte to achieve high charge/discharge capacity, long cycle life and to minimize the first cycle irreversible capacity according to the present invention.

The presence of at least one of the covalent O—X and O—Y bonds on opposite sides of the carbonyl group having a dissociation energy less than about 80 kcal/mole in the present compounds having the general formula X—O—CO—O—Y is important for improved performance of the alkali metal cells, and particularly lithium cells. Due to the relatively weak or low O—X or O—Y bond dissociation energy, the above listed family of additives competes effectively with electrolyte solvents or solutes to react with the lithium anode. Increased amounts of lithium carbonate are deposited on the anode surface to form an ionically conductive protective film. As a consequence, the chemical composition and perhaps the morphology of the anode surface protective layer is changed with concomitant benefits to the cell's discharge characteristics.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the carbonate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best modes contemplated by the inventors of carrying out the invention, but are not construed as limiting.

EXAMPLE I

Twelve lithium ion cells were constructed as test vehicles. The cells were divided into three groups of four cells. One group of cells was activated with a quaternary carbonate solvent system electrolyte devoid of a carbonate additive while the remaining cells had the same electrolyte but including a carbonate additive. Except for the electrolyte, the cells were the same. In particular, the cathode was prepared by casting a $LiCoO_2$ cathode mix on aluminum foil. The cathode mix contained 91% $LiCoO_2$, 6% graphite additive and 3% PVDF binder, by weight. The anode was prepared by casting an anode mixture containing 91.7% graphite and 8.3% PVDF binder, by weight, on a copper foil. An electrode assembly was constructed by placing one layer of polyethylene separator between the cathode and the anode and spirally winding the electrodes to fit into an AA sized cylindrical stainless steel can. The cells were activated with an electrolyte of EC:DMC:EMC:DEC=45:22:24.8:8.2 having 1.0M $LiPF_6$ dissolved therein (group 1). This electrolyte is at equilibrium with respect to the molar concentrations of DMC, DEC and EMC. The group 2 cells fabricated according to the present invention further had 0.05M dibenzyl carbonate (DBC) provided therein while the group 3 cell had 0.01M benzyl-(N-succinimidyl) carbonate (BSC) provided therein. Finally, the cells were hermetically sealed.

All twelve cells were then cycled between 4.1V and 2.75V. The charge cycle was performed under a 100 mA constant current until the cells reach 4.1V. Then, the charge cycle was continued at 4.1V until the current dropped to 20 mA. After resting for 5 minutes, the cells were discharged under a 100 mA constant current to 2.75 V. The cells were rested for another 5 minutes before the next cycle.

The initial average charge and discharge capacities of both groups of cells are summarized in Table 2. The first cycle irreversible capacity was calculated as the difference between the first charge capacity and the first discharge capacity.

TABLE 2

First Cycle Capacities and Irreversible Capacities

| Group | 1st Charge (mAh) | 1st Discharge (mAh) | Irreversible (mAh) |
|---|---|---|---|
| 1 | 627.0 ± 16.1 | 516.0 ± 18.7 | 111.0 ± 5.1 |
| 2 | 634.3 ± 12.4 | 550.1 ± 8.3 | 84.2 ± 5.4 |
| 3 | 628.9 ± 8.1 | 548.7 ± 4.2 | 80.2 ± 7.7 |

The data in Table 2 clearly demonstrate that all three groups of cells had similar first cycle charge capacities. However, the first cycle discharge capacities are quite different. The groups 2 and 3 cells activated with the electrolyte containing the DBC and BSC additives had significantly higher first cycle discharge capacities than that of the group 1 cells (approximately 6.6% higher for the group 2 cells and approximately 6.3% higher for the group 3 cells). As a result, the groups 2 and 3 cells also had about 24% and 28% lower first cycle irreversible capacities, respectively, than that of the group 1 cells.

EXAMPLE II

After the initial cycle, the cycling of the twelve cells continued for a total of 10 times under the same cycling conditions as described in Example I. The discharge capacities and the capacity retention of each cycle are summarized in Table 3. The capacity retention is defined as the capacity percentage of each discharge cycle relative to that of the first cycle discharge capacity.

TABLE 3

Cycling Discharge Capacity and Capacity Retention

| | Group 1 | | Group 2 | | Group 3 | |
|---|---|---|---|---|---|---|
| Cycle # | Capacity (mAh) | Retention (%) | Capacity (mAh) | Retention (%) | Capacity (mAh) | Retention (%) |
| 1 | 516.0 | 100.0 | 550.1 | 100.0 | 548.7 | 100.0 |
| 2 | 508.4 | 98.5 | 542.5 | 98.6 | 540.0 | 98.4 |
| 3 | 503.5 | 97.6 | 537.0 | 97.6 | 533.5 | 97.2 |
| 4 | 498.4 | 96.6 | 531.8 | 96.7 | 528.0 | 96.2 |
| 5 | 494.6 | 95.9 | 527.7 | 95.9 | 523.7 | 95.4 |
| 6 | 491.4 | 95.2 | 524.1 | 95.3 | 519.9 | 94.8 |
| 7 | 488.7 | 94.7 | 521.5 | 94.8 | 517.1 | 94.2 |
| 8 | 486.7 | 94.3 | 518.5 | 94.2 | 513.9 | 93.7 |
| 9 | 484.0 | 93.8 | 516.4 | 93.9 | 511.9 | 93.3 |
| 10 | 483.3 | 93.7 | 514.3 | 93.5 | 509.7 | 92.9 |

The data in Table 3 demonstrate that the group 2 and 3 cells with the DBC and BSC additive consistently presented higher discharge capacities in all cycles. In addition, this higher capacity was not realized at the expense of lower cycle life. The group 1, 2 and 3 cells had essentially the same cycling capacity throughout the various cycles.

EXAMPLE III

After the above cycle testing described in Example II, the cells were charged according to the procedures described in Example I. Then, the cells were discharged under a 1000 mA constant current to 2.75 V then a five minute open circuit rest, followed by a 500 mA constant current discharge to 2.75 V then a five minute open circuit rest, followed by a 250 mA constant current discharge to 2.75 V then a five minute open circuit rest and, finally, followed by a 100 mA constant current discharge to 2.75 V then a five minute open circuit rest. The averaged total capacities under each discharge rate are summarized in Table 4 and the comparison of averaged discharge efficiency (defined as % capacity of a 100 mA constant current discharge) under the various constant currents is summarized in Table 5. In Table 4, the discharge capacities are cumulative from one discharge current to the next.

TABLE 4

Discharge Capacities (mAh) under Various Currents

| Group | 1000 mA | 500 mA | 250 mA | 100 mA |
|---|---|---|---|---|
| 1 | 350.9 | 468.0 | 479.0 | 483.5 |
| 2 | 310.1 | 492.2 | 506.3 | 512.0 |
| 3 | 315.9 | 490.3 | 502.5 | 508.1 |

TABLE 5

Discharge Efficiency (%) under Various Currents

| Group | 1000 mA | 500 mA | 250 mA | 100 mA |
|---|---|---|---|---|
| 1 | 72.6 | 96.8 | 99.1 | 100.0 |
| 2 | 60.6 | 96.1 | 98.9 | 100.0 |
| 3 | 62.2 | 96.5 | 98.9 | 100.0 |

The data in Table 4 indicate that the group 2 and 3 cells with the carbonate additive each delivered increased discharge capacity in comparison to the group 1 control cells under a discharge rate equal to or less than 500 mA (approximately a 1C rate). Under a higher discharge rate (1000 mA, approximately a 2C rate), however, the group 1 control cells delivered slightly higher capacity than that of the group 2 and 3 cells. The same trends are also shown in Table 5. Under a 500 mA or lower discharge current, the group 2 and 3 cells presented similar discharge efficiencies than that of the group 1 cells. Under a higher discharge current (i.e. 1000 mA), the group 1 control cells afforded a higher discharge efficiency than that of the group 2 and 3 cells.

EXAMPLE IV

After the above discharge rate capability test, all the cells were fully charged according to the procedure described in Example I. The twelve test cells were then stored on open circuit voltage (OCV) at 37° C. for two weeks. Finally, the cells were discharged and cycled eight more times. The % of self-discharge and the capacity retention were calculated and are shown in Table 6.

TABLE 6

Rates of Self-Discharge and After Storage Capacity Retention

| Group | Self-Discharge (%) | Capacity Retention (%) |
|---|---|---|
| 1 | 13.6 | 92.3 |
| 2 | 15.4 | 93.5 |
| 3 | 13.9 | 92.9 |

Figure 2:
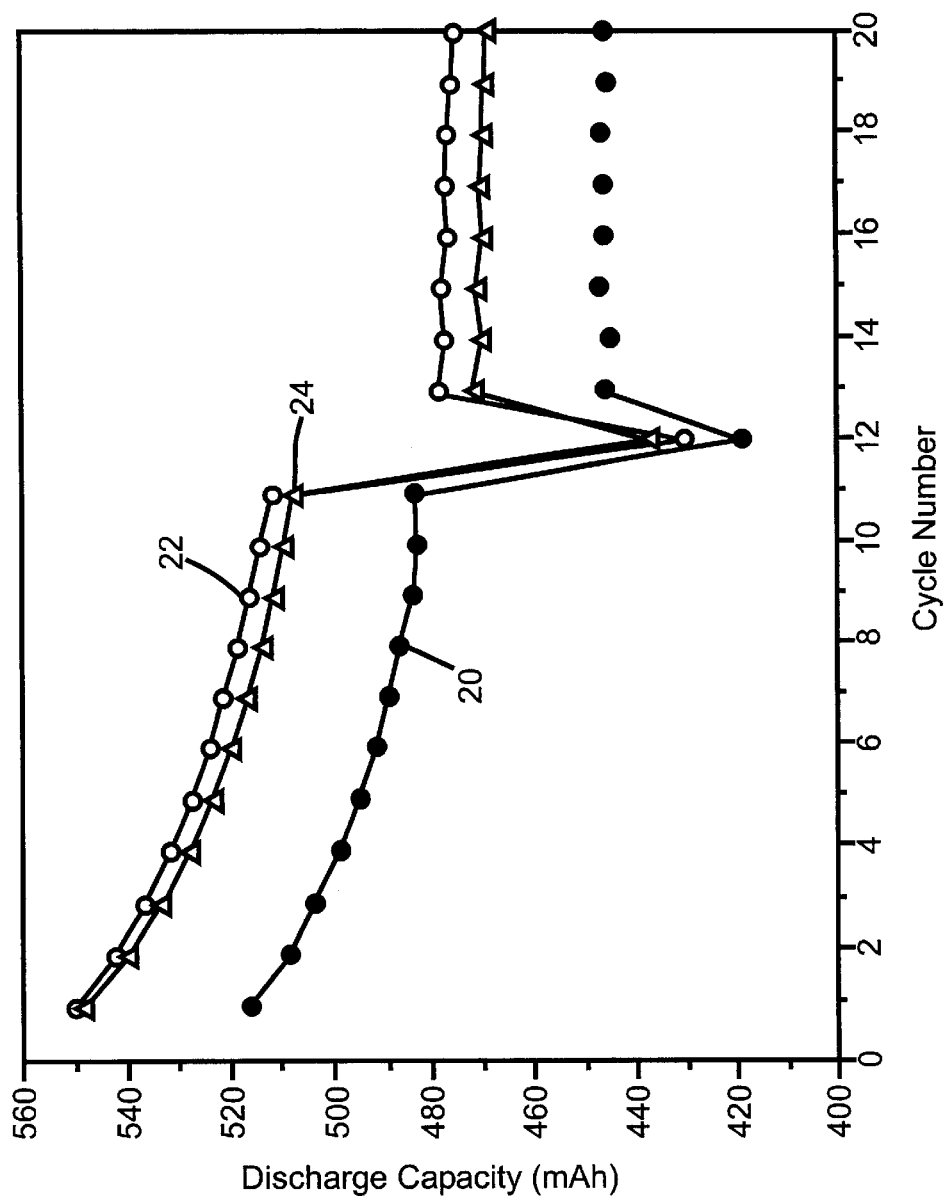
FIG. 2 is a graph showing the averaged discharge capacity through twenty cycles for three groups of lithium-ion cells, one group activated with a quaternary carbonate solvent mixture devoid of a carbonate additive in comparison to two similarly constructed cell groups, one having dibenzyl carbonate and the other having benzyl-(N-succinimidyl) carbonate as an electrolyte additive.

The data in Table 6 demonstrate that all three groups of cells exhibited similar self-discharge rates and similar after storage capacity retention rates. However, since the group 2 and 3 cells had higher discharge capacities than that of the group 1 cells, the capacities of the group 2 and 3 cells were still higher than that of the group 1 cells, even though they presented similar self-discharge and capacity retention rates. A total of 20 cycles were obtained and the results are summarized in FIG. 2. In particular, curve 20 was constructed from the averaged cycling data of the group 1 cells devoid of the carbonate additive, curve 22 was constructed from the averaged group 2 cells having the DBC additive and curve 24 was constructed from the averaged group 3 cells having the BSC additives. The increased discharge capacity through the twenty cycles is clearly evident.

In order to generate an electrically conductive SEI layer containing the reduction product of a carbonate additive according to the present invention, the reduction reaction of the carbonate additive has to effectively compete with reactions of other electrolyte components on the anode surface. In that regard, at least one of the covalent O—X and O—Y bonds on opposite sides of the carbonyl group having the general structure of X—O—CO—O—Y must have a dissociation energy less than about 80 kcal/mole. This point has been demonstrated in U.S. Pat. No. 5,753,389 to Gan et al., which is assigned to the assignee of the present invention and incorporated herein by reference. This patent describes that when the carbonate additive has a relatively weak O—X or O—Y bond, such as di-(N-succinimidyl) carbonate, benzyl-(N-succinimidyl) carbonate and dibenzyl carbonate, the beneficial effect is observed for primary lithium/silver vanadium oxide cells in terms of voltage delay reduction and reduced Rdc growth. Based on similar reasoning, it is believed that the same types of carbonate additives which benefit the discharge performance of a primary lithium electrochemical cell will also benefit first cycle irreversible capacity and cycling efficiency of lithium ion cells due to the formation of a good SEI film on the carbon anode surface.

While the present invention is not bound by any particular theory, it is believed that the formation of Li—O—CO—O—Y, Li—O—CO—O—X or Li—O—CO—O—Li deposited on the lithiated anode surface is responsible for the improved performance of the lithium-ion cells. If at least one of the covalent O—X and O—Y bonds on opposite sides of the carbonyl group is relatively weak during reduction, it breaks to form a product containing the Li—O—CO—O—Y or Li—O—CO—O—X, Li—O—CO—O—Li salt. This is believed to be the reason for the observed improvements in the lithium ion cells, as shown by those having the additives in the examples.

The concentration limit for the carbonate additive is preferably about 0.001M to about 0.40M. Generally, the beneficial effect of the carbonate additive will not be apparent if the additive concentration is less than about 0.001M. On the other hand, if the additive concentration is greater than about 0.40M, the beneficial effect of the additive will be canceled by the detrimental effect of higher internal cell resistance due to the thicker anode surface film formation and lower electrolyte conductivity.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
a) a negative electrode comprising a material which intercalates and deintercalates with an alkali metal;
b) a positive electrode comprising an alkali metal-containing electrode active material which intercalates and deintercalates with the alkali metal;
c) a nonaqueous electrolyte activating the negative and the positive electrodes, the electrolyte including a mixture of dimethyl carbonate (DMC), ethyl methyl carbonate (EMC) and diethyl carbonate (DEC), wherein with the negative electrode deintercalated with the alkali metal and the positive electrode intercalated with the alkali metal before being activated with the electrolyte, the dimethyl carbonate, ethyl methyl carbonate and diethyl carbonate are in an essentially equilibrated molar mixture as determined by the graph of:

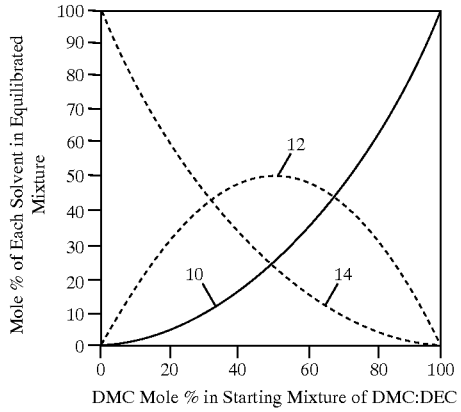

wherein from a beginning molar mixture of DMC and DEC solvents in a ratio of a % of DMC and 1-a % of DEC entered on the abscissa of the graph and then from the a(DMC) % point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC; and d) a carbonate additive having the general formula X—O—CO—O—Y provided in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole, and wherein X and Y are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$; and e) wherein $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl;

f) wherein $R_3$, $R_4$, $R_5$, $R'_3$, $R'_4$ and $R'_5$ are independently selected from the group consisting of:
i) H;
ii) a substituted or unsubstituted aryl group of 6 to 14 ring members;
iii) a substituted or unsubstituted heteroaryl group of 6 to 14 ring members;
iv) a branched or unbranched $C_{1-9}$ alkyl;
v) a branched or unbranched $C_{1-9}$ alkenyl;
vi) a branched or unbranched $C_{1-9}$ alkynyl;
vii) a $C_{1-9}$ alkoxy;
viii) a $C_{3-14}$ cycloalkyl;
ix) a $C_{3-14}$ cycloalkenyl; and
x) —$CX_3$ in which X=Cl or F;

g) wherein $R_6$, $R_7$, $R'_6$ and $R'_7$ are independently selected from the group consisting of:
i) a substituted or unsubstituted aryl group of 6 to 14 ring members;
ii) a substituted or unsubstituted heteroaryl group of 6 to 14 ring members; and
iii) a cyano group; and h) wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

2. The electrochemical cell of claim 1 wherein the carbonate additive is selected from the group consisting of di-(N-succinimidyl) carbonate, benzyl-(N-succinimidyl) carbonate, di(1-benzotriazolyl)carbonate, N-(benzyloxycarbonyloxy)succinimide, N-benzyloxycarbonyloxy-5-norbornene-2,3-dicarboximide, N-(9-fluorenylmethoxycarbonyloxy) succinimide, 2-(4-methoxybenzyloxycarbonyloxyimino)-2-phenylacetonitrile, 1,5-bis(succinimidooxycarbonyloxy)pentane, succinimidyl-2,2,2-trichloroethyl carbonate, diallyl carbonate, allyl ethyl carbonate, 4-phenyl-1,3-dioxolan-2-one, dibenzyl carbonate, succinimidyl benzotriazolyl carbonate, and mixtures thereof.

3. The electrochemical cell of claim 1 wherein the carbonate additive is present in the electrolyte in a range of about 0.001M to about 0.40M.

4. The electrochemical cell of claim 1 wherein the carbonate additive is dibenzyl carbonate present in the electrolyte at a concentration up to about 0.05M.

5. The electrochemical cell of claim 1 wherein the carbonate additive is benzyl-(N-succinimidyl) carbonate present in the electrolyte at a concentration up to about 0.01M.

6. The electrochemical cell of claim 1 wherein the electrolyte further includes ethylene carbonate in the range of about 10% to about 50%, and the dimethyl carbonate is in the range of about 3% to about 75%, the ethyl methyl carbonate is in the range of about 5% to about 50%, and the diethyl carbonate is in the range of about 3% to about 45%, by molar.

7. The electrochemical cell of claim 1 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

8. The electrochemical cell of claim 7 wherein the alkali metal is lithium.

9. The electrochemical cell of claim 1 including selecting the negative electrode material from the group consisting of coke, carbon black, graphite, acetylene black, carbon fibers, glassy carbon, and mixtures thereof.

10. The electrochemical cell of claim 1 wherein the carbonaceous material is mixed with a fluoro-resin binder.

11. The electrochemical cell of claim 1 wherein the lithiated material of the positive electrode is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

12. The electrochemical cell of claim 11 wherein the lithiated material is mixed with a fluoro-resin binder.

13. The electrochemical cell of claim 11 wherein the lithiated material is mixed with a conductive addition selected from the group consisting of acetylene black, carbon black, graphite, nickel powder, aluminum powder, titanium powder, stainless steel powder, and mixtures thereof.

14. An electrochemical cell, which comprises:
   a) a negative electrode comprising a carbonaceous material which intercalates and deintercalates with lithium;
   b) a positive electrode comprising lithium cobalt oxide; and
   c) an electrolyte solution activating the negative electrode and the positive electrode, the electrolyte including an alkali metal salt dissolved in a mixture of dimethyl carbonate (DMC), ethyl methyl carbonate (EMC) and diethyl carbonate (DEC), wherein with the negative electrode deintercalated with the alkali metal and the positive electrode intercalated with the alkali metal before being activated with the electrolyte, the dimethyl carbonate, ethyl methyl carbonate and diethyl carbonate are in an equilibrated molar mixture as determined by the graph of:

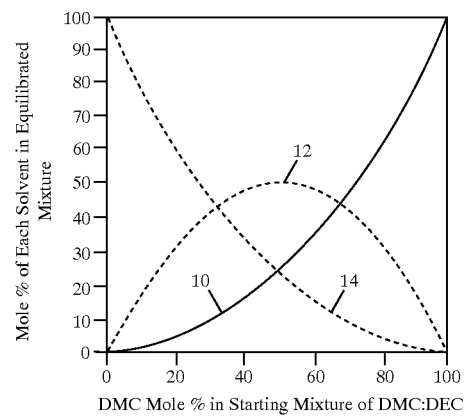

wherein from a beginning molar mixture of DMC and DEC solvents in a ratio of a % of DMC and 1-a % of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC; and d) a carbonate additive having the general formula X—O—CO—O—Y provided in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole, and wherein X and Y are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$; and e) wherein $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl;

f) wherein $R_3$, $R_4$, $R_5$, $R'_3$, $R'_4$ and $R'_5$ are independently selected from the group consisting of:
   i) H;
   ii) a substituted or unsubstituted aryl group of 6 to 14 ring members;
   iii) a substituted or unsubstituted heteroaryl group of 6 to 14 ring members;
   iv) a branched or unbranched $C_{1-9}$ alkyl;
   v) a branched or unbranched $C_{1-9}$ alkenyl;
   vi) a branched or unbranched $C_{1-9}$ alkynyl;
   vii) a $C_{1-9}$ alkoxy;
   viii) a $C_{3-14}$ cycloalkyl;
   ix) a $C_{3-14}$ cycloalkenyl; and
   x) —$CX_3$ in which X=Cl or F;

g) wherein $R_6$, $R_7$, $R'_6$ and $R'_7$ are independently selected from the group consisting of:
   i) a substituted or unsubstituted aryl group of 6 to 14 ring members;
   ii) a substituted or unsubstituted heteroaryl group of 6 to 14 ring members; and
   iii) a cyano group; and h) wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

15. The electrochemical cell of claim 14 wherein the carbonate additive is selected from the group consisting of di-(N-succinimidyl) carbonate, benzyl-(N-succinimidyl) carbonate, di(1-benzotriazolyl)carbonate, N-(benzyloxycarbonyloxy)succinimide, N-benzyloxycarbonyloxy-5-norbornene-2,3-dicarboximide, N-(9-fluorenylmethoxycarbonyloxy)succinimide, 2-(4-methoxybenzyloxycarbonyloxyimino)-2-phenylacetonitrile, 1,5-bis (succinimidooxycarbonyloxy)pentane, succinimidyl-2,2,2-trichloroethyl carbonate, diallyl carbonate, allyl ethyl carbonate, 4-phenyl-1,3-dioxolan-2-one, dibenzyl carbonate, succinimidyl benzotriazolyl carbonate, and mixtures thereof.

16. The electrochemical cell of claim 14 wherein the electrolyte further includes ethylene carbonate in the range of about 10% to about 50%, and the dimethyl carbonate is in the range of about 3% to about 75%, the ethyl methyl carbonate is in the range of about 5% to about 50%, and the diethyl carbonate is in the range of about 3% to about 45%, by molar.

17. The electrochemical cell of claim 14 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

18. An electrochemical cell, which comprises:
a) a negative electrode comprising a material which intercalates and deintercalates with lithium;
b) a positive electrode comprising an electrode active material which intercalates and deintercalates with the lithium;
c) a nonaqueous electrolyte activating the negative and the positive electrodes, the electrolyte including a mixture of dimethyl carbonate (DMC), ethyl methyl carbonate (EMC) and diethyl carbonate (DEC), wherein with the negative electrode deintercalated with the lithium and the positive electrode intercalated with the lithium before being activated with the electrolyte, the dimethyl carbonate, ethyl methyl carbonate and diethyl carbonate are in an equilibrated molar mixture as determined by the graph of:

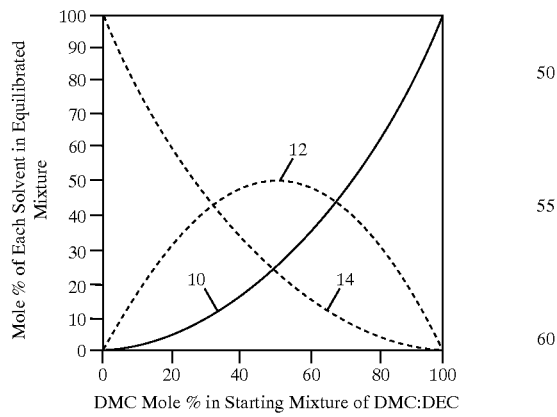

wherein from a beginning molar mixture of DMC and DEC solvents in a ratio of a % of DMC and 1-a % of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC;

d) a carbonate additive having the general formula X—O—CO—O—Y provided in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole; and e) wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

19. A method for providing an electrochemical cell, comprising the steps of:
a) providing a negative electrode comprising a carbonaceous material which intercalates and deintercalates with an alkali metal;
b) providing a positive electrode comprising a lithiated electrode active material which intercalates and deintercalates with the alkali metal;
c) activating the negative and positive electrodes with a nonaqueous electrolyte, the electrolyte including a mixture of dimethyl carbonate (DMC), ethyl methyl carbonate (EMC) and diethyl carbonate (DEC), and further including assembling the negative electrode deintercalated with the alkali metal and the positive electrode intercalated with the alkali metal before activating the negative electrode and the positive electrode with the electrolyte having the dimethyl carbonate, ethyl methyl carbonate and diethyl carbonate in an equilibrated molar mixture as determined by the graph of:

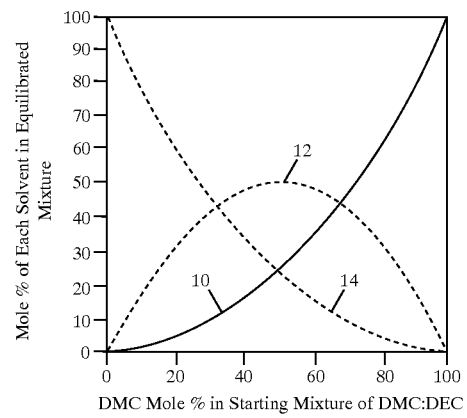

wherein from a beginning molar mixture of DMC and DEC solvents in a ratio of a % of DMC and 1-a % of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC; and d) providing a carbonate additive having the general formula X—O—CO—O—Y in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole, and wherein X and Y are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$;

e) wherein $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl;

f) wherein $R_3$, $R_4$, $R_5$, $R'_3$, $R'_4$ and $R'_5$ are independently selected from the group consisting of:
  i) H;
  ii) a substituted or unsubstituted aryl group of 6 to 14 ring members;
  iii) a substituted or unsubstituted heteroaryl group of 6 to 14 ring members;
  iv) a branched or unbranched $C_{1-9}$ alkyl;
  v) a branched or unbranched $C_{1-9}$ alkenyl;
  vi) a branched or unbranched $C_{1-9}$ alkynyl;
  vii) a $C_{1-9}$ alkoxy;
  viii) a $C_{3-14}$ cycloalkyl;
  ix) a $C_{3-14}$ cycloalkenyl; and
  x) —$CX_3$ in which X=Cl or F;

g) wherein $R_6$, $R_7$, $R'_6$ and $R'_7$ are independently selected from the group consisting of:
  i) a substituted or unsubstituted aryl group of 6 to 14 ring members;
  ii) a substituted or unsubstituted heteroaryl group of 6 to 14 ring members; and
  iii) a cyano group; and h) wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

20. The method of claim 19 including selecting the carbonate additive from the group consisting of di-(N-succinimidyl) carbonate, benzyl-(N-succinimidyl) carbonate, di(1-benzotriazolyl)carbonate, N-(benzyloxycarbonyloxy)succinimide, N-benzyloxycarbonyloxy-5-norbornene-2,3-dicarboximide, N-(9-fluorenylmethoxycarbonyloxy)succinimide, 2-(4-methoxybenzyloxycarbonyloxyimino)-2-phenylacetonitrile, 1,5-bis(succinimidooxycarbonyloxy)pentane, succinimidyl-2,2,2-trichloroethyl carbonate, diallyl carbonate, allyl ethyl carbonate, 4-phenyl-1,3-dioxolan-2-one, dibenzyl carbonate, succinimidyl benzotriazolyl carbonate, and mixtures thereof.

21. The method of claim 19 wherein the carbonate additive is present in the electrolyte in a range of about 0.001M to about 0.40M.

22. The method of claim 19 wherein the carbonate additive is dibenzyl carbonate present in the electrolyte at a concentration up to about 0.05M.

23. The method of claim 19 wherein the carbonate additive is benzyl-(N-succinimidyl)carbonate present in the electrolyte at a concentration up to about 0.01M.

24. The method of claim 19 wherein the electrolyte further includes ethylene carbonate in the range of about 10% to about 50%, and the dimethyl carbonate is in the range of about 3% to about 75%, the ethyl methyl carbonate is in the range of about 5% to about 50%, and the diethyl carbonate is in the range of about 3% to about 45%, by molar.

25. The method of claim 19 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

26. The method of claim 19 wherein the alkali metal is lithium.

27. The method of claim 19 wherein the lithiated electrode active material of the positive electrode is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

28. The method of claim 19 wherein the carbonaceous material of the negative electrode is selected from the group consisting of coke, carbon black, graphite, acetylene black, carbon fibers, glassy carbon, and mixtures thereof.

29. An electrochemical cell, which comprises:
  a) a negative electrode of a negative electrode active material which intercalates and deintercalates with an alkali metal;
  b) a positive electrode comprising an alkali metal intercalated electrode active material which intercalates and deintercalates with the alkali metal;
  e) an electrolyte solution activating the negative and positive electrodes, the electrolyte including an alkali metal salt dissolved in a mixture comprising dimethyl carbonate (DMC), ethyl methyl carbonate (EMC) and diethyl carbonate (DEC), wherein with the negative electrode deintercalated with the alkali metal and the positive electrode intercalated with the alkali metal before being activated with the electrolyte, the DMC, EMC and DEC are in an essentially equilibrated mixture, by molar percent, as determined by the formula: $[EMC]^2/([DMC][DEC])$ equal to about 4.0±0.15 and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges;
  d) a carbonate additive having the general formula X—O—CO—O—Y in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole, and wherein X and Y are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$;

e) wherein $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl;

f) wherein $R_3$, $R_4$, $R_5$, $R'_3$, $R'_4$ and $R'_5$ are independently selected from the group consisting of:
  i) H;
  ii) a substituted or unsubstituted aryl group of 6 to 14 ring members;
  iii) a substituted or unsubstituted heteroaryl group of 6 to 14 ring members;
  iv) a branched or unbranched $C_{1-9}$ alkyl;
  v) a branched or unbranched $C_{1-9}$ alkenyl;
  vi) a branched or unbranched $C_{1-9}$ alkynyl;
  vii) a $C_{1-9}$ alkoxy;
  viii) a $C_{3-14}$ cycloalkyl;
  ix) a $C_{3-14}$ cycloalkenyl; and
  x) —$CX_3$ in which X=Cl or F; and g) wherein $R_6$, $R_7$, $R'_6$ and $R'_7$ are independently selected from the group consisting of:
  i) a substituted or unsubstituted aryl group of 6 to 14 ring members;
  ii) a substituted or unsubstituted heteroaryl group of 6 to 14 ring members; and
  iii) a cyano group.

30. The electrochemical cell of claim 29 wherein the carbonate solvent mixture further includes at least one cyclic carbonate selected from the group consisting of ethylene carbonate, propylene carbonate, butylene carbonate and vinylene carbonate.

31. A method for converting chemical energy to electrical energy from an electrochemical cell, comprising the steps of:

a) providing a negative electrode comprising a carbonaceous negative electrode active material which intercalates and deintercalates with an alkali metal;

b) providing a positive electrode comprising an alkali metal intercalated electrode active material which intercalates and deintercalates with the alkali metal;

f) providing an electrolyte including an alkali metal salt dissolved in a mixture comprising dimethyl carbonate (DMC), ethyl methyl carbonate (EMC) and diethyl carbonate (DEC);

e) providing a carbonate additive having the general formula X—O—CO—O—Y in the electrolyte, wherein the additive is either linear or cyclic and includes covalent O—X and O—Y bonds on opposite sides of a carbonyl group and at least one of the O—X and the O—Y bonds has a dissociation energy less than about 80 kcal/mole, and wherein X and Y are the same or different and X is selected from $NR_1R_2$, $CR_3R_4R_5$ and $N(=C)R_6R_7$ and Y is selected from $NR'_1R'_2$, $CR'_3R'_4R'_5$ and $N(=C)R'_6R'_7$;

f) wherein $R_1$, $R_2$, $R'_1$ and $R'_2$ are a substituted or unsubstituted N-containing heterocyclic group of 6 to 14 ring members in which the nitrogen of the heterocycle is bonded to the oxygen bonded to the carbonyl;

g) wherein $R_3$, $R_4$, $R_5$, $R'_3$, $R'_4$ and $R'_5$ are independently selected from the group consisting of:
  i) H;
  ii) a substituted or unsubstituted aryl group of 6 to 14 ring members;
  iii) a substituted or unsubstituted heteroaryl group of 6 to 14 ring members;
  iv) a branched or unbranched $C_{1-9}$ alkyl;
  v) a branched or unbranched $C_{1-9}$ alkenyl;
  vi) a branched or unbranched $C_{1-9}$ alkynyl;
  vii) a $C_{1-9}$ alkoxy;
  viii) a $C_{3-14}$ cycloalkyl;
  ix) a $C_{3-14}$ cycloalkenyl; and
  x) —$CX_3$ in which X=Cl or F;

h) wherein $R_6$, $R_7$, $R'_6$ and $R'_7$ are independently selected from the group consisting of:
  i) a substituted or unsubstituted aryl group of 6 to 14 ring members;
  ii) a substituted or unsubstituted heteroaryl group of 6 to 14 ring members; and
  iii) a cyano group;

j) assembling the negative electrode deintercalated with the alkali metal and the positive electrode intercalated with the alkali metal before activating the negative electrode and the positive electrode with the electrolyte having the DMC, EMC and DEC in an essentially equilibrated mixture, by molar percent, as determined by the formula: $[EMC]^2/([DMC][DEC])$ equal to about 4.0±0.15; and k) re-charging the cell a first time with the negative electrode intercalating the alkali metal and the positive electrode deintercalating the alkali metal, wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

32. The method of claim 31 including providing the carbonate solvent mixture further having at least one cyclic carbonate selected from the group consisting of ethylene carbonate, propylene carbonate, butylene carbonate and vinylene carbonate.

* * * * *

UNITED STATES PATENT AND TRADEMARK OFFICE
CERTIFICATE OF CORRECTION

PATENT NO.   : 6,759,170 B2
DATED        : July 6, 2004
INVENTOR(S)  : Hong Gan et al.

It is certified that error appears in the above-identified patent and that said Letters Patent is hereby corrected as shown below:

Column 20,
Line 43, item "e)" should read -- c) --;

Column 21,
Line 46, item "f)" should read -- c) --;
Line 50, item "e)" should read -- d) --;

Column 22,
Line 4, item "f)" should read -- e) --;
Line 8, item "g)" should read -- f) --;
Line 23, item "h)" should read -- g) --;
Line 31, item "j)" should read -- h) --; and
Line 39, item "k)" should read -- i) --.

Signed and Sealed this

Fourteenth Day of September, 2004

JON W. DUDAS
*Director of the United States Patent and Trademark Office*